(12) United States Patent
Atkinson et al.

(10) Patent No.: US 6,984,260 B2
(45) Date of Patent: Jan. 10, 2006

(54) DEVICE FOR DIVERTING FLUID FROM A PIPELINE

(75) Inventors: David Ian Heaton Atkinson, Ely (GB); Colin Morison, Comberton (GB)

(73) Assignee: Schlumberger Technology Corp., Ridgefield, CT (US)

( * ) Notice: Subject to any disclaimer, the term of this patent is extended or adjusted under 35 U.S.C. 154(b) by 78 days.

(21) Appl. No.: 10/344,605

(22) PCT Filed: Jul. 30, 2001

(86) PCT No.: PCT/GB01/03438

§ 371 (c)(1),
(2), (4) Date: Jun. 20, 2003

(87) PCT Pub. No.: WO02/16822

PCT Pub. Date: Feb. 28, 2002

(65) Prior Publication Data

US 2004/0035294 A1 Feb. 26, 2004

(30) Foreign Application Priority Data

Aug. 23, 2000 (GB) .................................. 0020658

(51) Int. Cl.
*B01D 19/00* (2006.01)
(52) U.S. Cl. .................. 96/188; 96/216; 73/200
(58) Field of Classification Search .................. 95/261; 96/188, 189, 216; 166/75.12; 73/861.04, 73/200; 137/87.04, 171, 386, 861
See application file for complete search history.

(56) References Cited

U.S. PATENT DOCUMENTS

| | | | | |
|---|---|---|---|---|
| 1,798,774 A | * | 3/1931 | Yates | 166/267 |
| 2,588,296 A | * | 3/1952 | Russell, Jr. | 166/57 |
| 3,578,077 A | * | 5/1971 | Glenn et al. | 166/68 |
| 4,046,698 A | | 9/1977 | Pielkenrood | |
| 4,319,635 A | * | 3/1982 | Jones | 166/401 |
| 4,519,815 A | | 5/1985 | Buls et al. | |
| 4,622,048 A | * | 11/1986 | Roberts et al. | 96/188 |
| 4,676,308 A | | 6/1987 | Chow et al. | |
| 4,708,793 A | * | 11/1987 | Cathriner et al. | 210/188 |
| 4,760,742 A | | 8/1988 | Hatton | |
| 4,860,591 A | | 8/1989 | Garland | |
| 5,127,272 A | * | 7/1992 | Dean et al. | 73/861.04 |

(Continued)

FOREIGN PATENT DOCUMENTS

DE 858 832 12/1952

(Continued)

OTHER PUBLICATIONS

Atkinson et al. New generation multiphase flowmeters from Schlumberger and Framo Engineering AS 17$^{th}$ International North Sea Flow Measurement Workshop, Oslo, Norway, 1999.

(Continued)

*Primary Examiner*—Frank M. Lawrence
(74) *Attorney, Agent, or Firm*—William L. Wang; William B. Batzer; Jody Lynn DeStefanis

(57) ABSTRACT

A device for diverting liquid from a pipeline is described having a first conduit; a second conduit connected to the first conduit at at least a first location and a second location; with the second conduit having a first section to collect diverted liquid and a second elongated section adapted to contain at least parts of the diverted liquid with a hydrostatic head or level reactive to a pressure drop between the first and second location thus controlling flow of liquid from the first conduit through the second conduit by balancing the pressure drop with the hydrostatic head or level.

16 Claims, 8 Drawing Sheets

U.S. PATENT DOCUMENTS 5,390,547 A * 2/1995 Liu .................. 73/861.04
5,526,684 A 6/1996 Liu et al.
6,318,156 B1 * 11/2001 Dutton et al. .............. 73/61.44

FOREIGN PATENT DOCUMENTS

| EP | 0 286 259 A2 | 3/1988 |
|---|---|---|
| GB | 1 208 121 | 2/1967 |
| JP | 07185525 | 12/1993 |
| SU | 1257460 | 9/1986 |
| SU | 1313487 | 5/1987 |

OTHER PUBLICATIONS

Ram Babu et al. Downhole chemcial addition owing to convection in annular liquid Journal of Petroleum Technology, vol. 46, No. 3, 1994, p. 191.

* cited by examiner

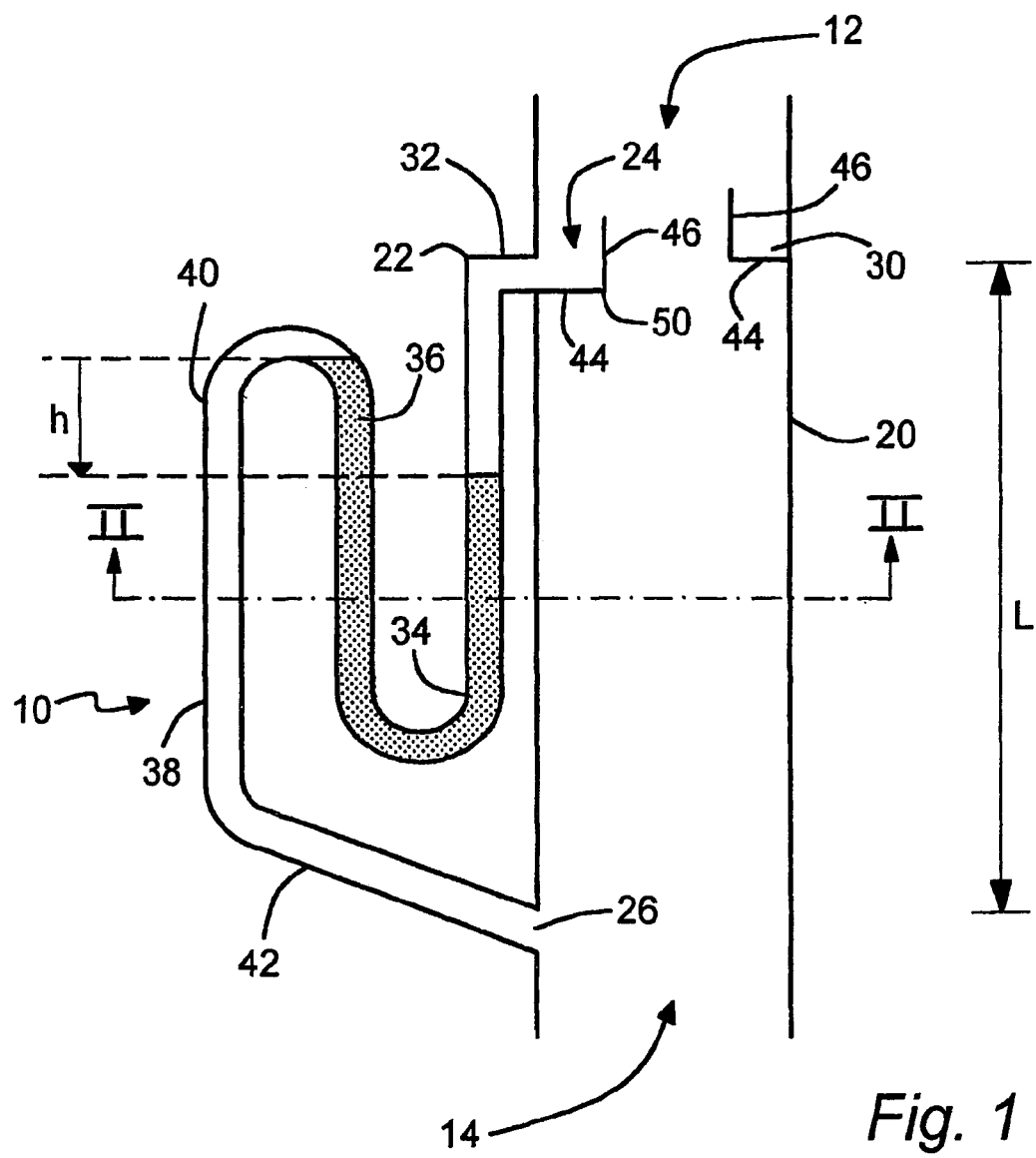
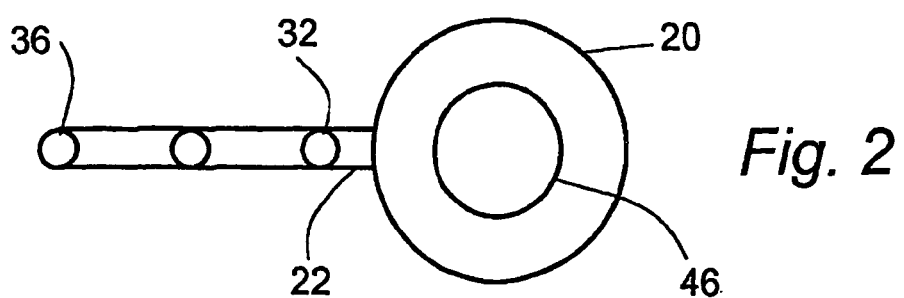
Fig. 1
Fig. 2

DEVICE FOR DIVERTING FLUID FROM A PIPELINE

FIELD OF THE INVENTION

This invention relates to a device for diverting fluid from a pipeline and is particularly concerned with separating oil and water from a multi-phase flow of gas, oil and water.

BACKGROUND TO THE INVENTION

In the oil industry, the water-liquid-ratio (wlr) is an important measurement of the output flowing from a well and for wells producing a three-phase flow (gas, oil and water) separator systems are used to separate the gas, oil and water into individual streams to simplify the wlr measurement. However separator systems are heavy, bulky, costly and prone to failure and obtaining three separate streams for each component can be complicated and costly.

Where the liquid, i.e. water and oil, is not separated and metering is performed on the multi-phase flow, the measurement of the wlr can be very difficult, particularly when the volume fraction of gas in the line is high. For example, where the wlr is 10% in a multi-phase flow with 90% gas, then 1% of the total volume is water, 9% is oil and 90% is gas. Measurement of the wlr in a multi-phase flow requires detecting the presence of the 1% by volume of water, whereas if all the gas is removed leaving an oil-water flow, measurement of the wlr requires detecting the presence of the 10% by volume of water. Removing gas from the multi-phase stream to produce a liquid-rich stream therefore makes measurement of the wlr easier.

Hydrocyclones are used to produce a liquid-rich stream from a multi-phase flow. However these systems tend to be large and result in the liquid and gas phases travelling in opposite directions which can cause problems with pipe layout.

It is an aim of the present invention to produce a device for obtaining a liquid-rich stream without the disadvantages associated with the prior art, and also aims to provide a device for retrofitting to existing flow meters to increase their range of operation.

SUMMARY OF THE INVENTION

In accordance with one aspect of the present invention, there is a device for diverting liquid from a pipeline, the device comprising a first conduit, a second conduit connected across at least part of the first conduit, and means for controlling flow of liquid from the first conduit through the second conduit by use of hydrostatic pressure.

Such a device is particularly applicable for surface pipelines transporting gas-rich flows from wells, the flow being of around 90% gas, with the remaining percentage by volume consisting of oil and water. The device is suitable for use as a flowmeter when used in combination with appropriate gauges, and also is such as to allow sampling as liquid can be tapped off separately to gas. The device is also intended for retrofitting to existing flowmeters to increase the range over which flows can be measured, with the device acting to provide an offset to these meters, or the device can be incorporated into the flowmeter during manufacture.

In use, the device is typically connected to a pipeline transporting a multi-phase flow which is predominantly made up of gas, with the first conduit arranged to be substantially vertical relative to the earth's surface.

Therefore the first conduit in use is preferably connected between two sections of an existing pipeline. This particularly requires the pipeline flow to be stopped whilst the pipeline is cut to allow the placing of the device.

The means for controlling flow of liquid from the first conduit through the second conduit is preferably provided by an S-shaped section within the second conduit. Thus the second conduit may incorporate the means for controlling the flow of liquid. By using an S-shaped bend and arranging the second conduit to provide a bypass route across a length of the first conduit, the pressure drop across the bypassed length of the first conduit will be balanced by a difference in the height of fluid in the two curved sections forming the S-shaped bend. As a result, if more liquid is introduced into the second conduit, the level of fluid in the S-shaped bend alters to remain in equilibrium with the pressure drop across the length of the first conduit, as a result of hydrostatic pressure, and thus new fluid introduced into the second conduit will force fluid out of the S-bend and into a return section of the second conduit thereby to return to the first conduit.

The second conduit may further comprise a collecting means placed at least partly within the first conduit, and thus the second conduit preferably further comprises an annulus extending inwards from an inner wall of the first conduit and a lip extending upwards from an inner circumference of the annulus, and acting to trap liquid travelling along the walls of the first conduit and direct liquid into the second conduit.

The second conduit may comprise an elongate lip attached to the annulus or collar, with the elongate lip forming a baffle plate to act to separate liquid from the gas flow.

Preferably the first conduit is provided with an inlet at substantially right angles to the first conduit. This tangential inlet ensures that in use fluid passing into the first conduit gains a certain degree of centrifugal force to further assist with separation of liquid components from the gas.

The collecting means may further comprise receptacle means in communication with the first conduit and the annulus. This allows a volume of liquid to be stored before the liquid enters the S-shaped section, and so provides time for gas inadvertently trapped in the liquid to escape the liquid whilst it is held in the receptacle means prior to entry into the S-shaped section, the gas then returning to the first conduit.

The receptacle means is preferably placed adjacent to the annulus and the first conduit, and connected thereto by first and second passages.

Alternatively the receptacle means surrounds the annulus and at least part of the first conduit with two spaced apart apertures in an encased wall of the first conduit providing communication between the receptacle means, annulus and first conduit.

The second conduit may further comprise an elongate section extending from an end of the S-shaped section furthest from the first conduit, the elongate section providing a generally downward path and joining with the first conduit at a distance below an inlet to the second conduit.

The second conduit may comprise a delay section leading from the collecting means and joining with a first end of the S-shaped section, the delay section comprising a hollow cylinder of tapering cross section which is wound around the first conduit to form a spiral.

The device is suitable for use with surface pipes, but may be adapted for use on a vertical well pipe such as a borehole.

BRIEF DESCRIPTION OF DRAWINGS

The invention is now described, by way of example, with reference to the following drawings in which:

FIG. 1 shows a section through a first embodiment of a device in accordance with the present invention;

FIG. 2 shows a sectional view on the line II—II of FIG. 1;

DESCRIPTION

Figure 3:
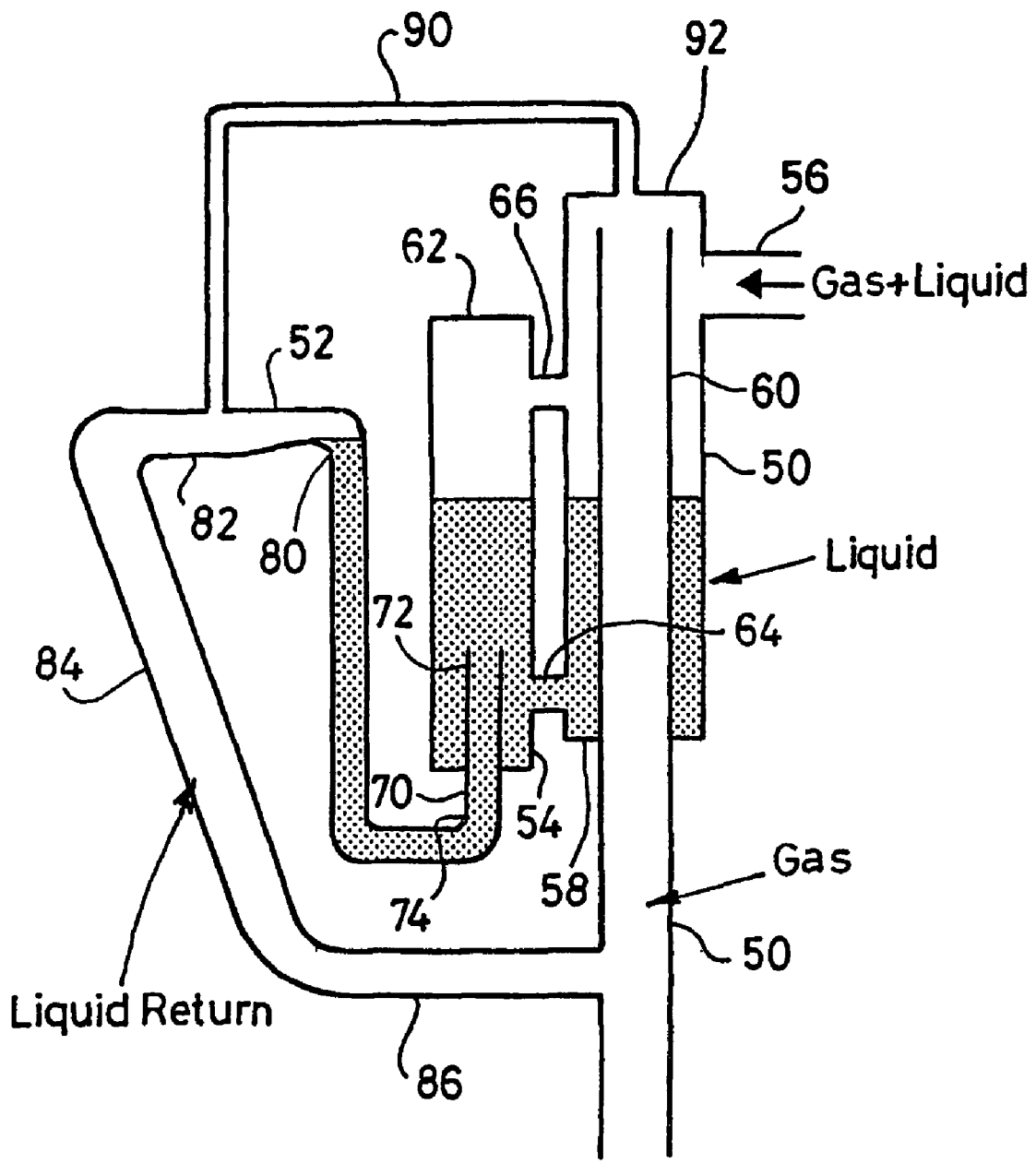
FIG. 3 shows a section through a second embodiment of a device in accordance with the present invention.

A device 10 in accordance with the present invention is illustrated in FIG. 1. Typically the device is inserted into a surface pipeline carrying a multi-phase flow of gas, oil and water from a well. To insert the device, the flow in the pipeline is stopped, and the pipeline cut and modified so that an upstream portion of pipeline feeds into an inlet 12 of the device with a downstream portion of the pipeline connected to an outlet 14 of the device. The device is placed at right angles to ground level.

The device 10 is made from metal and comprises a first conduit 20 and a second conduit 22. The first conduit 20 has a circular cross-section of typically the same size as the cross-section of the pipeline, whilst the second conduit 22 has generally a substantially smaller circular cross-section than the first conduit. The walls of the first and second conduits are of a suitable thickness to withstand the pressures associated with multi-phase production flows, and thus are typically of a thickness that will withstand 5000 psi.

The second conduit 22 is connected across a length L of the vertical first conduit 20 so providing a path along which liquid can be temporarily diverted from the main conduit, entering inlet 24 before returning to the main conduit at outlet 26. The second conduit 22 comprises a collecting means 30 joined to the inlet 24 and which sits within the first conduit 20, a first elongate section 32 of pipe attached between the inlet 24 and a first end 34 of an S-shaped section 36, a second elongate section 38 joined to a second end 40 of the S-shaped section, and a downwardly slanting section 42 leading from the second elongate section to the outlet 26 and joining to the first conduit 20. The collecting means 30 comprises an annulus 44, of the same outer diameter as the first conduit, and a lip 46 extending upwards from an inner edge 50 of the annulus 44.

FIG. 2 shows a sectional view along line II—II of FIG. 1 from which can be seen the cross-section of the second conduit 22, excluding the collecting means, and the cross-section of the first conduit 20 are circular, with the diameter of the first conduit 20 being substantially greater than the diameter of the second conduit 22.

When a multi-phase flow travels in a pipeline, the liquid in the flow, i.e. oil and water, predominantly travels along the walls of the pipeline as a result of frictional effects. Thus by placing an annulus 44 with a lip 46 within the first conduit 20, the liquid portion of the gas-liquid flow is channelled into the second conduit 22. In the embodiment shown in FIG. 1, some gas will pass with this liquid into the second conduit 22, but, as will be explained later, due to the residence time of liquid within the S-shaped section 36, much of the gas will return to the first conduit 20.

A second embodiment of the device is shown in FIG. 3, and comprises a main conduit 50 and a secondary conduit 52 incorporating a more complex collecting means 54 than that of the first embodiment. Instead of flow from the pipeline travelling down into the first conduit, i.e. with gravity, a tangential inlet 56 to the main conduit 50 is provided. The second collecting means 54 comprises an annulus 58 with an elongate lip 60 which extends up beyond the tangential inlet 56 so as to act as baffle plate, and a substantially enclosed cylinder 62. The cylinder has a lower inlet 64 which joins with the first conduit 50 and so connects to the annulus 58 as well, and an upper inlet 66 placed further up the wall of the first conduit. The remainder of the second conduit comprises a first elongate section 70, an upper end 72 of which extends up and into the cylinder 62 and is open to receive liquid, with a lower end 74 attached to a first end of an S-shaped section 80. A flared elongate section 82 joins to a second end of the S-shaped section 80 and leads into a downwardly slanting section 84 which in turn connects with a horizontal portion 86 of pipe meeting the first conduit 50 at a position below the collecting means. An anti-siphon line 90 is provided between the flared section 82 and an uppermost end 92 of the first conduit 50 so as to ensure that automatic siphoning of the liquid through the system does not occur. The dimensions of the device are approximately 1200 mm (high)×500 mm×500 mm.

This embodiment has enhanced gas rejection over the first embodiment as the passage time of the liquid through the device is increased due to the increased volume of the collecting means. In addition, the tangential inlet imparts a certain degree of centrifugal force to the fluid as it enters the first conduit and this produces a swirling effect in the flow which assists with separation of liquid from gas. The baffle plate also acts to increase separation of liquid from gas as, when the multi-phase flow hits the baffle plate, the passage of liquid is abruptly halted causing the liquid to fall to the base of the collecting annulus. However the gas is not so affected and passes along the length of the first conduit.

Figure 4:
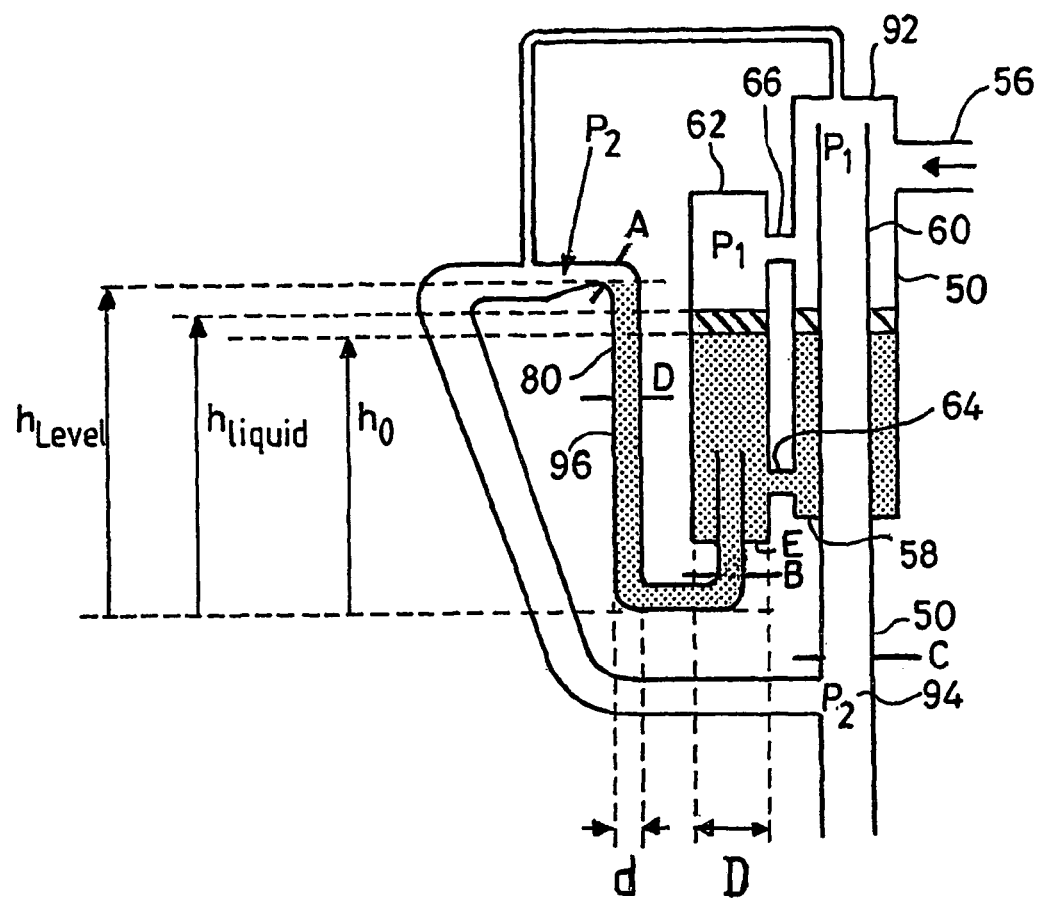
FIG. 4 corresponds to FIG. 3 and is used to explain operation of the device.

The operation of the device will now be described with reference to FIG. 4, which uses common reference numerals to FIG. 3 where appropriate. The device uses the principle of hydrostatic pressure to provide a controllable passage of liquid through the system, eventually to return to the first conduit. The device thus avoids the need for any moving parts or any external control for the device to operate. When a multi-phase flow enters the first conduit 50 via the tangential inlet 56, liquid incident on the baffle plate 60 falls down to the collecting annulus 58 and, due to the interconnection of the annulus, cylinder 62 and S-shaped bend 80, will pass into all these parts of the second conduit. Gas in the multi-phase flow is largely unaffected by the presence of the baffle plate 60 and generally will simply continue flowing along the length of the first conduit, although some gas will be trapped in the liquid falling into annulus 58.

A pressure drop exists in the first conduit 50 due to gravity, with gas at the upper end 92 of the conduit being at a lower pressure $P_1$ than gas at a lower end 94 of the conduit which is at pressure $P_2$. The pressure difference, $P_{1-P2}$, of around 100 mbar is balanced by the head of liquid in the S-shaped bend 80, i.e. the pressure exerted by the liquid $h_{liquid}-h_0$. Thus in the equilibrium position where fluid has been introduced into the second conduit but where, for example, flow has then stopped, the height of liquid in the S-shaped bend is greater than the height of the liquid in the collecting means by an amount that balances the pressure difference.

As more liquid is introduced into the collecting portion of the conduit, the system moves out of equilibrium. Thus the level of liquid in the cylinder and annulus will be such that the head of liquid does not balance the pressure drop $\Delta P$. The system will act to restore the equilibrium state and thus increase the level of fluid in the S-bend to $h_{level}$ so as to ensure that the head balances the pressure drop. Liquid is thus forced up and out of a vertical portion 96 of the S-bend and into the flared portion 82 to return to the first conduit, as the system continuously acts to restore equilibrium as liquid flows into the second conduit. The maximum liquid extraction flow rate is a function of the dimensions of the device, but for a device of dimension 1200 mm×500 mm×500 mm is typically 8 m³ an hour.

To explain in more detail, the equilibrium state is thus when no liquid is extracted and the hydrostatic head, $\rho g(h_{Level}-h_0)$ is balanced by the pressure drop $P_{1-P2}$:

$$\Delta P = P_1 - P_2 = \rho g(h_{Level} - h_0) \tag{1}$$

where $\rho$ is the liquid density, $h_{Level}$ is the greatest height of liquid in S-shaped section 80 of diameter d, and $h_{liquid}$ is the height of liquid in the cylinder which has diameter D.

For a liquid velocity of $v_1$ in diameter D, the velocity $v_2$ in diameter d is $$v_2 = v_1 \frac{D^2}{d^2} \tag{2}$$

When $h_{Liquid} > h_0$ then liquid flows through the device and with a liquid velocity in diameter D of $v_1$, the liquid velocity $v_2$ in diameter d, can be written as $$v_2 = \sqrt{\left(\frac{2}{\rho}\right) \frac{(\Delta P - P_{Losses} - \rho g(h_{Level} - h_{Liquid}))}{\left(1 - \frac{d^4}{D^4}\right)}} \tag{3}$$

where $$P_{Losses} = \frac{2 f \rho v_2^2 L_{Losses}}{d} \tag{4}$$

and $$f = aRe^{-b} \text{ Blasius formula, } a=0.079, b=0.25 \tag{5}$$

and $$Re = \frac{\rho v_2 d}{\eta_{liquid}} \tag{6}$$

where $P_{Losses}$ is the pressure loss in diameter d, $L_{Losses}$ the equivalent straight pipe length diameter d, and $\eta_{liquid}$ the viscosity of the liquid.

When $v_2=0$ then $P_{Losses}=0$, and $\Delta P$ is given by equation (1). $h_0$ should be chosen to be large enough so that no liquid enters the liquid leg, in which case $$v_2 = \sqrt{\left(\frac{2}{\rho}\right) \frac{(\rho g(h_{Liquid} - h_0) - P_{Losses})}{\left(1 - \frac{d^4}{D^4}\right)}} \tag{7}$$

For $v_2 > 0$, then $P_{Losses} < \rho g(h_{Liquid} - h_0) = 0$

The maximum value of $v_2$ (or equivalently the maximum liquid extracted=$v_2 \pi d^2/4$) is driven by $h_{Liquid}$ and this determines the total height of the device.

Thus if there is only gas in the main flow line then the equilibrium state is when the hydrostatic pressure difference between $h_{liquid}$ and $h_0$ equals the pressure difference between the top of the first conduit and where the second conduit returns to join the first conduit. If the hydrostatic pressure of the liquid head is less than $\Delta P$, then fluid will flow over the top bend of the S-shaped section and return to the main flow line via sections 82, 84, 86.

This system is self regulating in that liquid will only flow out of the S-bend section when liquid is in the annulus, cylinder and S-shaped section and the hydrostatic head, h, is too small to balance the pressure difference $\Delta P$. Hence a heavy liquid phase will flow through the device, if there is only gas in the main flow line there will be no flow through the device, and the device rejects gas.

As mentioned previously, some gas will be trapped with the liquid when it is collected from the first conduit, and to ensure that the wlr measurement is easy to perform, as much gas as possible needs to be returned to the main conduit. A delay time, or lag, before liquid enters the S-shaped section is desirable so that gas caught within the liquid can escape.

There are a variety of ways of producing such a delay, with the second embodiment achieving this by increasing the volume of liquid waiting to pass into the S-shaped section.

The increased residence time of the liquid in the collection means allows gas bubbles trapped within the liquid to have an extended time in which to rise to the surface of the liquid and return to the first conduit by means of the first conducting passageway 66. There are other ways of increasing the residence time, and these are discussed with reference to FIGS. 6 and 7. Ideally the residence time is around 5 s or such that the time for gas to rise to the surface of liquid in the collection means is less than the time for fluid to pass from the collection means to the S-shaped bend. The residence time needed depends on the distance the gas has to travel through the liquid to reach a liquid-gas interface and the velocities of the gas and liquid phases.

The devices discussed herein selectively divert liquid from a multi-phase flow so that the wlr can readily be measured, without a large proportion of gas being associated with the liquid and interfering with the measurement. The devices have many uses in that they allow direct sampling of the liquid by placing valves at positions A and B, and easy measurement of liquid and gas flow rates by placing a gas flow meter at position C and a liquid flow and/or wlr meter at position D. The devices can also be used as a sandtrap by placing a valve at E to draw sand out of the base of cylinder 62, and the devices can be used to provide liquid removal from a flow by pumping liquid out of the device from any point in return path 82, 84, 86 before the liquid returns to the main conduit. The device can also be used as a compact separator of liquid for multi-phase flows.

In situations where a representative liquid sample is required the collection means is positioned in an area of high mixing of gas and liquid.

The devices can also be used for measurement of oil shrinkage, cleaning of the system by fluid injection, and calibration of any meter positioned at D by injecting fluids of known properties at known velocities.

Local heating can also be used to increase the flow of viscous fluids through the device.

Enhanced liquid removal can be achieved by careful design of the flow conditions upstream of the device and by positioning two or more devices in series.

Figure 5:
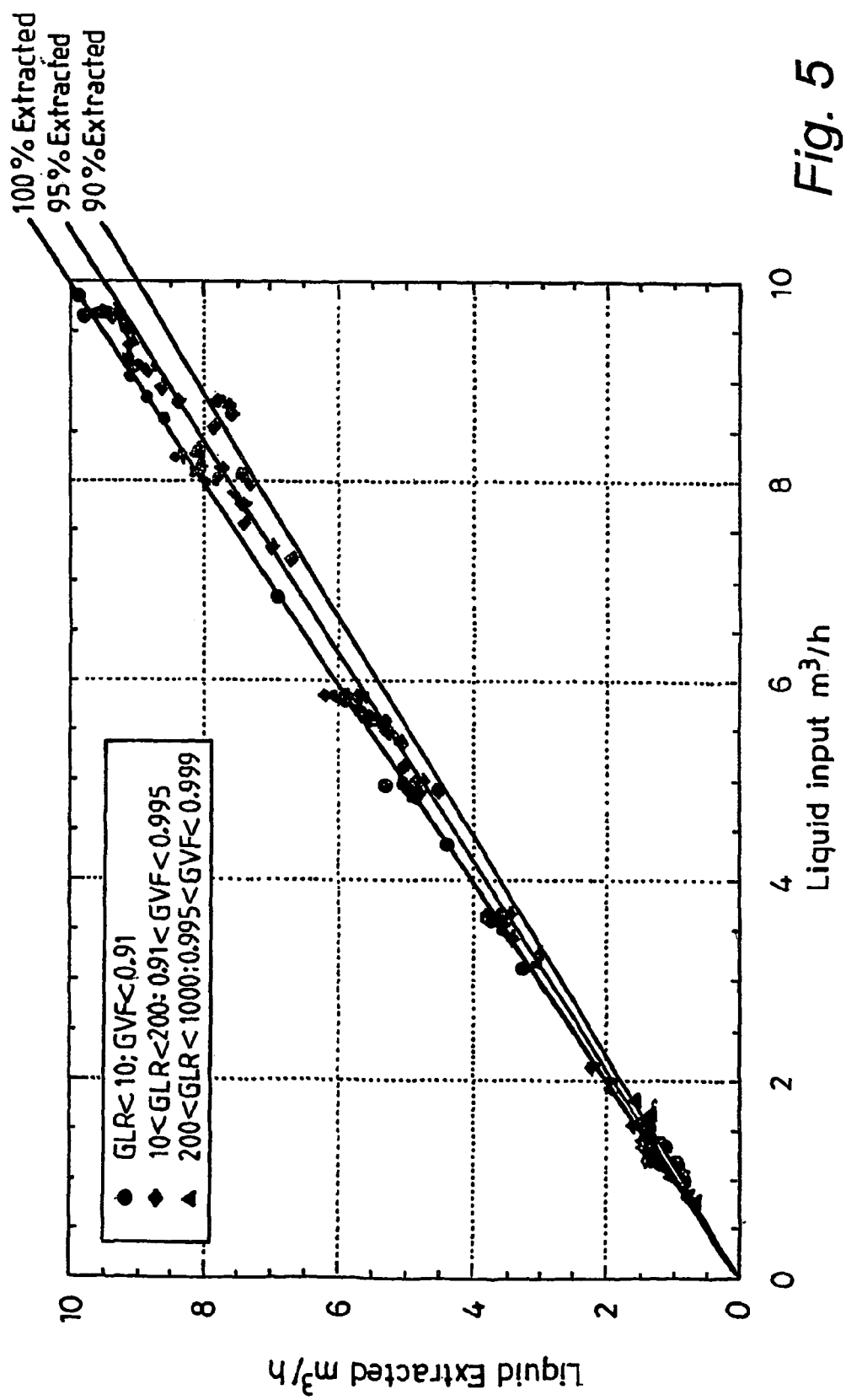
FIG. 5 is a graph illustrating the amount of liquid extracted as a percentage of liquid input for the device shown in FIG. 3.

With a device such as shown in FIG. 3, it is possible to extract around 90% of the liquid in a liquid gas flow. This is illustrated by the graph of FIG. 5 which plots the "liquid extracted" against "the liquid input into the first conduit" for a variety of different water liquid ratios ranging from glr (gas volume rate/liquid flow rate) less than 10 and gvf (gas volume rate/total volume) less than 0.91, up to glr in the range of 200–1000 and gvf in the range 0.995–0.999. The liquid extracted has less than 1% gas entrained.

Figure 6:
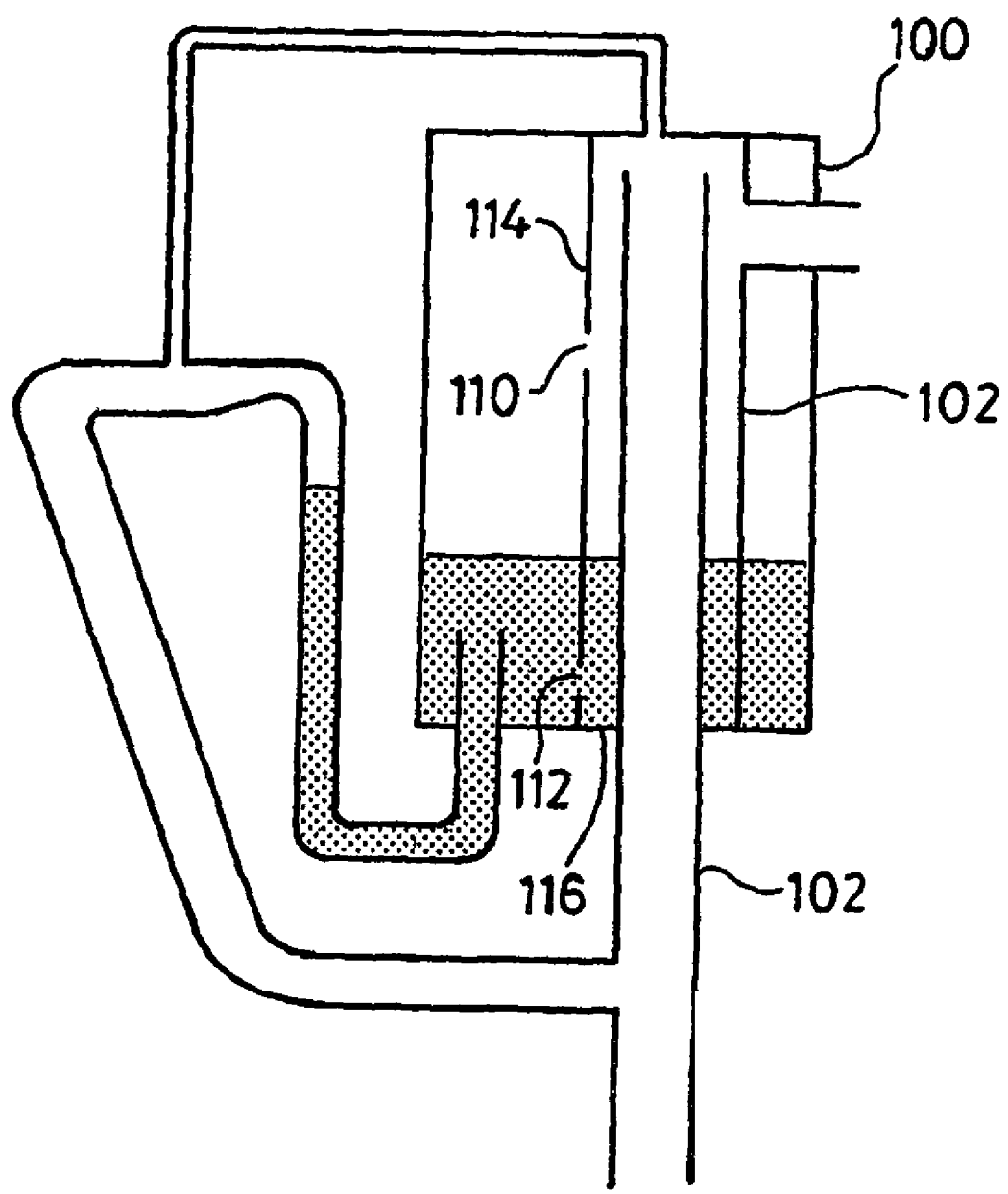
FIG. 6 shows a section through of a third embodiment of a device in accordance with the present invention.

FIG. 6 shows a further embodiment of a device in accordance with the invention where a cylinder 100 surrounds a portion of a first conduit 102 with upper 110 and lower 112 apertures in plate 114 providing communication paths for gas and liquid between a collecting annulus 116 and the first conduit 102.

Figure 7:
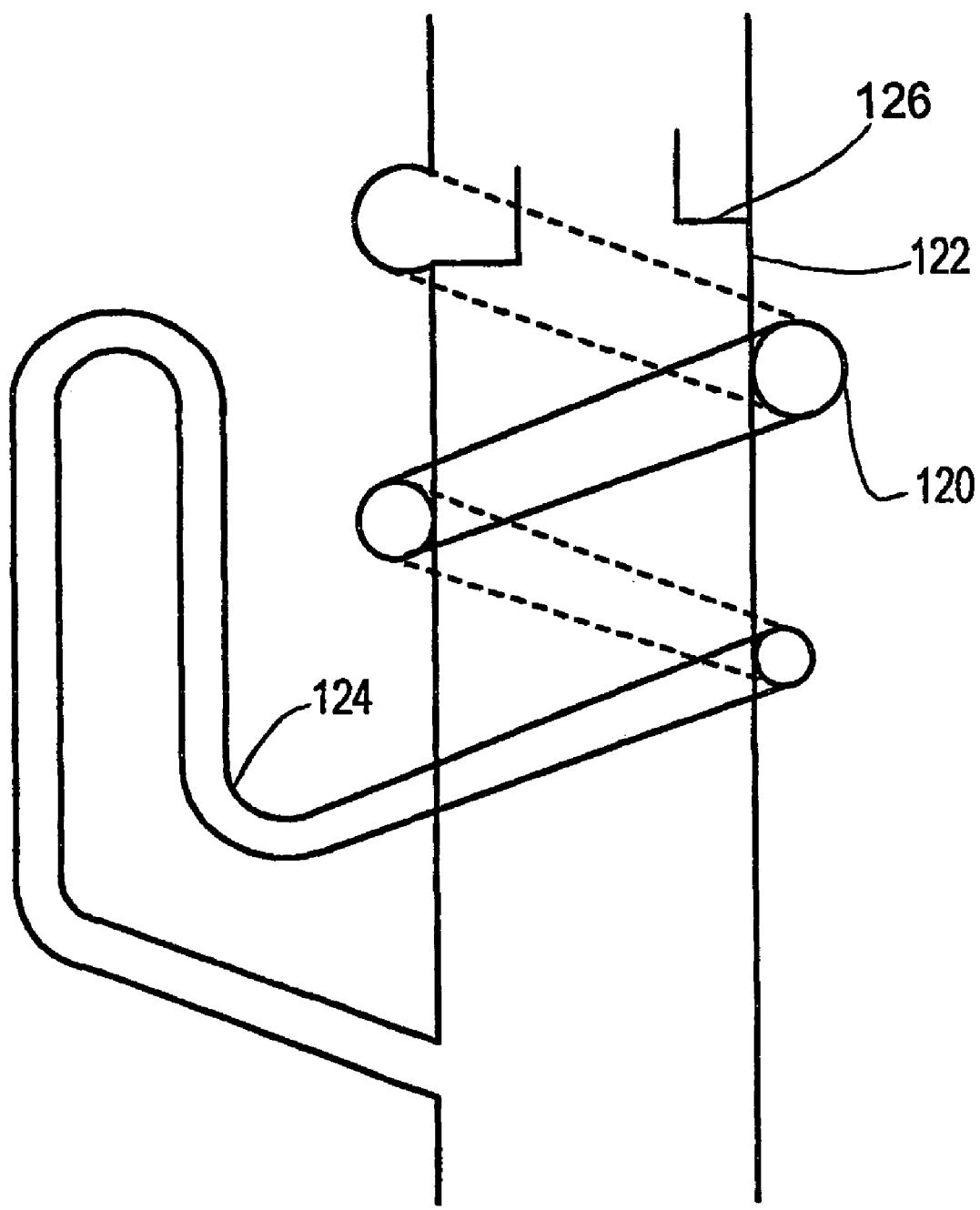
FIG. 7 shows a section through a fourth embodiment of a device in accordance with the present invention.

FIG. 7 illustrates another embodiment of the present invention, where to increase residence time of fluid in the device, a tapering cross-section pipe 120 is wound around a first conduit 122 to lead into an S-shaped bend 124. The diameter of this pipe 120 and the pitch of the winding are such that the flow in this pipe is stratified with the liquid on the lower surface of the pipe. In this case, any gas in the liquid has to travel a distance equal to the thickness of the liquid stratified layer before exiting via the collecting means 126. Having a pipe with a decreasing diameter enhances this effect. This ensures that the liquid collected within the S-bend is to a large extent gas free.

Figure 8:
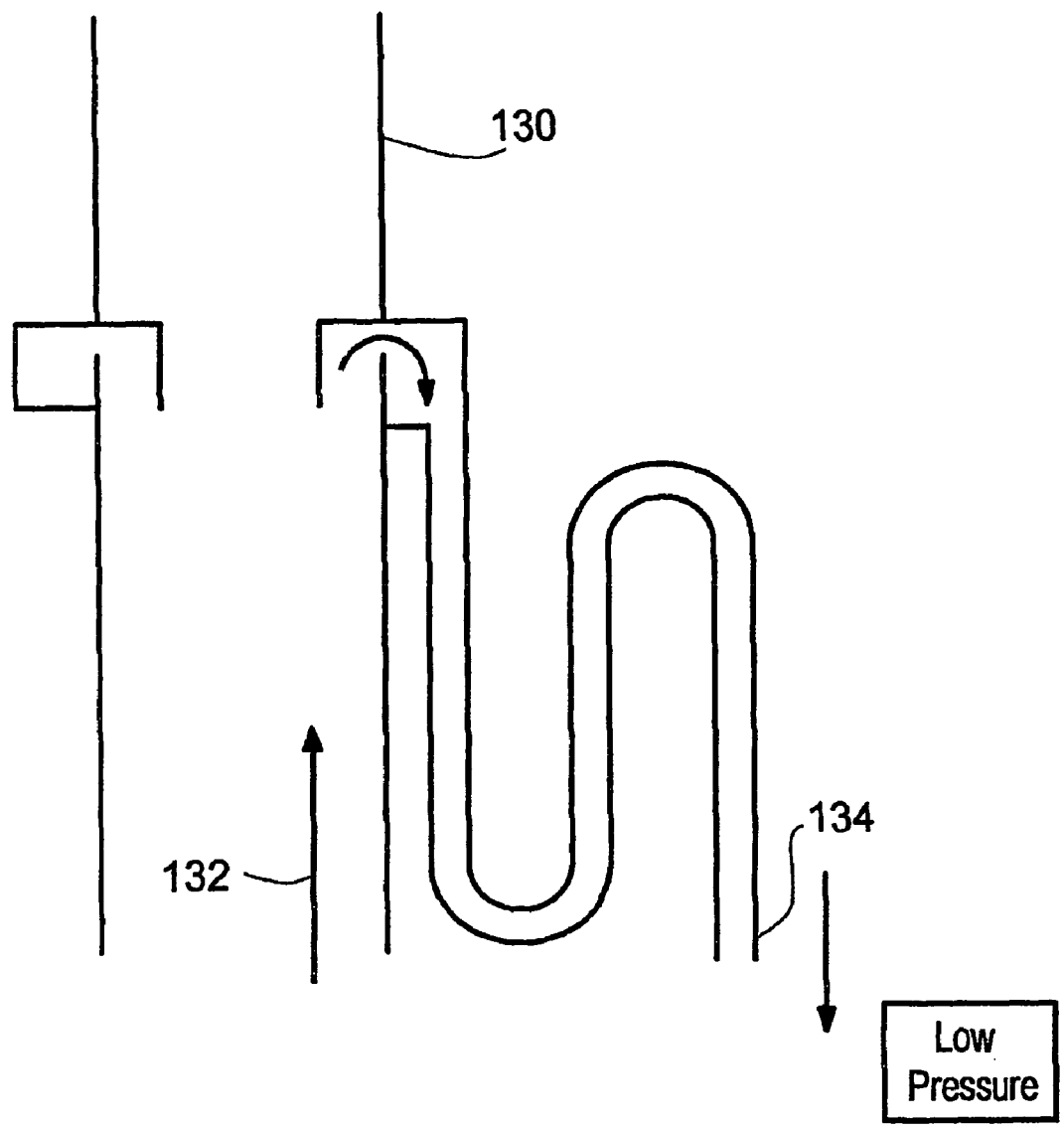
FIG. 8 shows a section through a fifth embodiment of a device in accordance with the present invention.

A further embodiment is illustrated at FIG. 8, this being a device for use in an operational well 130 with fluid flowing up to surface as shown by arrow 132. By providing low pressure at one end 134 of the device, liquid collection can be achieved in a similar manner as aforesaid.

Figure 9:
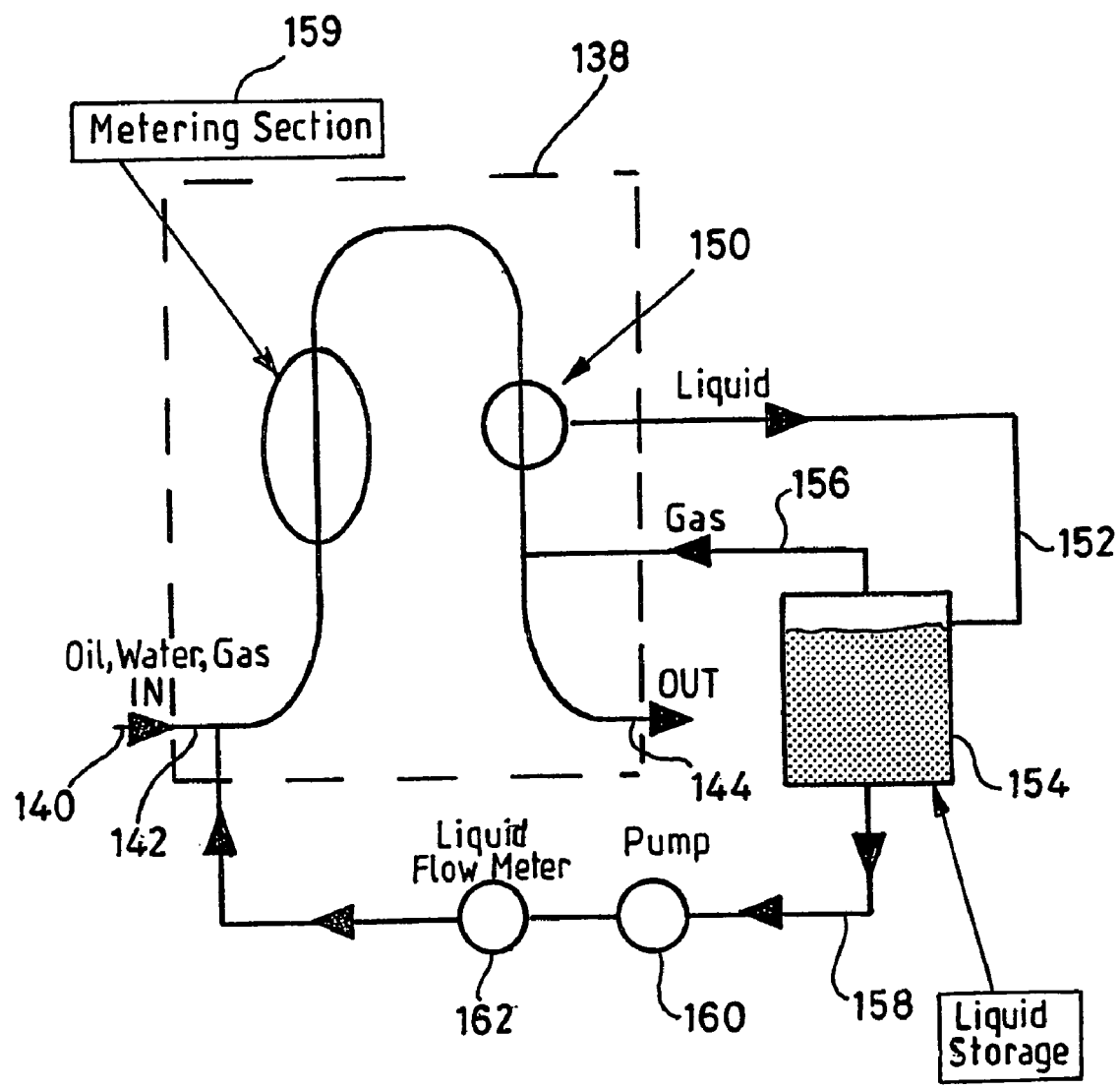
FIG. 9 shows a schematic diagram of a flowmeter incorporating a device in accordance with the present invention.

A device in accordance with the present invention can also be used to modify existing flowmeters so as to extend their range of operation, and this is shown in FIG. 9.

Multi-phase flowmeters are used in the oil industry to measure the flow rates of oil, water and gas in a pipeline without separating the phases. These meters have an operational range with a lower limit that can generally only be modified by a change in dimensions or by use of additional meters. One way of lowering the operating range of a multi-phase meter therefore involves a second multi-phase meter in series with the first. In the cases where the oil, water and gas phases are separated into individual streams, lowering the range involves adding additional meters to each flow line: this is costly as the number of meters needed is doubled and each meter is expensive. However in accordance with another aspect of the present invention, a device in generally the same form as that discussed previously is fitted to, either on manufacture or by retrofitting, a multi-phase meter so as to increase flow by a known amount that allows the meter to function over an increased operating range.

Such a modified flow meter 138 is illustrated schematically in FIG. 9. The basic flow meter is described in Atkinson, I., Berard, M. B-V Hanssen, G Segeral: "New Generation Multiphase Flowmeters from Schlumberger and Framo Eng.AS.," 17$^{th}$ International North Sea Flow Measurement Workshop, Oslo, Norway, October 1999. A multi-phase flow 140 is fed into an input 142 of the flowmeter and passes through the meter to outlet 144. A device 150 in accordance with the invention, such as that depicted in FIG. 3, is inserted in the outlet, or downstream, path of the meter and the device used to divert liquid from the multi-phase flow, the liquid passing along path 152 to a liquid storage tank 154. Any gas contained in the liquid is returned along line 156 to the outlet path. The liquid in the liquid storage tank 154 is fed back along line 158 to the inlet 142, and upstream of the metering section 159, by pump 160, and the amount of liquid fed back is monitored by liquid flow meter 162.

This increases the total liquid flow through the multi-phase meter by a measured amount such that the flow through the meter is within the original operating range. The actual flow in the main pipeline is computed from the difference between the flow measured by the multi-phase meter and that measured by the meter in the liquid line. The flow 'returned' is only liquid phases to simplify the metering and pumping operation as then metering can be performed with a liquid meter and standard liquid pump. The accuracy of the liquid flow rate will be decreased slightly as a result of using two meters, for example, if the accuracy of the multi-phase meter is ±5% and the liquid meter is ±2% then the final accuracy of the combined meter will be ±5.4% (using RMS method).

The size of the tank 154 depends upon the efficiency of the device 150, the liquid volume rate required to be pumped to get the multi-phase meter within its operating range, and the measurement time of the multi-phase meter.

The above-described embodiments are illustrative of the invention only and are not intended to limit the scope of the present invention.

What is claimed is:

1. A device for diverting liquid from a pipeline, the device comprising:
   a first conduit;
   a second conduit connected to the first conduit at at least a first location and a second location; said second conduit having a first section to collect diverted liquid and a second elongated section adapted to contain at least parts of the diverted liquid with a hydrostatic head or level reactive to a pressure drop between the first and second location thus controlling flow of liquid from the first conduit through the second conduit by balancing the pressure drop with the hydrostatic head or level.

2. A device according to claim 1, wherein the assembly for controlling flow of liquid from the first conduit through the second conduit comprises an S-shaped section within the second conduit.

3. A device according to claim 1, wherein the first conduit is provided with an inlet at substantially right angles to the first conduit.

4. A device according to claim 1, wherein the first section of the second conduit further comprises a collector placed at least partly within the first conduit.

5. A device according to claim 4, wherein the collector comprises an annulus extending inwards from an inner wall of the first conduit and a lip extending upwards from an inner circumference of the annulus.

6. A device according to claim 5, wherein the lip is elongate and extends upwards to an inlet of the first conduit, so as to act as a baffle plate.

7. A device according to claim 5, wherein the collector further comprises a receptacle in communication with the first conduit and the annulus.

8. A device according to claim 7, wherein the receptacle is placed adjacent to the annulus and the first conduit, and connected thereto by first and second passages.

9. A device according to claim 7, wherein the receptacle surrounds the annulus and at least part of the first conduit with two spaced apart apertures in an encased wall of the first conduit providing communication between the receptacle, annulus and first conduit.

10. A device according to claim 2, wherein the second conduit further comprises an elongate section extending from an end of the S-shaped section furthest from the first conduit, the elongate section providing a generally downward path and joining with the first conduit at a distance below an inlet to the second conduit.

11. A device according to claim 4, wherein the second conduit comprises a delay section leading from the collector and joining with a first end of the S-shaped section, the delay section comprising a hollow cylinder of tapering cross section which is wound around the first conduit to form a spiral.

12. A device according to claim 1, wherein the first conduit is part of a pipeline connected to a borehole.

13. A device according to claim 1, wherein an anti-siphon line connects the second conduit with the first conduit.

14. A flow meter fitted with a device according to claim 1.

15. A device according to claim 1 wherein the second conduit joins the first conduit at the second location.

16. A device according to claim 1 wherein the second conduit includes a third section downwardly slanted towards the second location to join the second conduit with the first conduit.

* * * * *